US012572174B2

(12) United States Patent
Yoo et al.

(10) Patent No.: US 12,572,174 B2
(45) Date of Patent: Mar. 10, 2026

(54) DISPLAY DEVICE

(71) Applicant: Samsung Display Co., Ltd., Yongin-Si (KR)

(72) Inventors: Jewon Yoo, Yongin-si (KR); Youngji Kim, Yongin-si (KR); Hyun Kim, Yongin-si (KR); Seungmin Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 243 days.

(21) Appl. No.: 18/232,972

(22) Filed: Aug. 11, 2023

(65) Prior Publication Data

US 2024/0176393 A1 May 30, 2024

(30) Foreign Application Priority Data

Nov. 24, 2022 (KR) ......................... 10-2022-0159125

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC .................................................... G06F 1/1652
See application file for complete search history.

(56) References Cited

U.S. PATENT DOCUMENTS

| | | | | |
|---|---|---|---|---|
| 7,359,215 | B2 * | 4/2008 | Ochiai | H10K 59/80 |
| | | | | 174/254 |
| 9,224,973 | B2 * | 12/2015 | Park | H10K 50/844 |
| 9,818,974 | B2 | 11/2017 | Kwon et al. | |
| 2016/0268546 | A1 * | 9/2016 | Lee | B32B 5/18 |
| 2017/0054106 | A1 * | 2/2017 | Jeon | H10K 59/873 |
| 2017/0179423 | A1 * | 6/2017 | Kwon | H10K 59/873 |
| 2018/0217639 | A1 * | 8/2018 | Jones | H05K 1/028 |
| 2024/0405058 | A1 * | 12/2024 | Lee | H10H 29/142 |
| 2024/0431193 | A1 * | 12/2024 | Choi | H10K 71/80 |
| 2025/0017076 | A1 * | 1/2025 | Kim | H10K 59/131 |
| 2025/0048914 | A1 * | 2/2025 | Han | H10K 77/111 |

FOREIGN PATENT DOCUMENTS

| | | |
|---|---|---|
| KR | 10-2017-0071986 | 6/2017 |
| KR | 10-2020-0080752 | 7/2020 |
| KR | 10-2340920 | 12/2021 |

* cited by examiner

*Primary Examiner* — Adrian S Wilson
(74) *Attorney, Agent, or Firm* — F. CHAU & ASSOCIATES, LLC

(57) ABSTRACT
A display device includes a display panel including a base substrate and pixels. The base substrate includes first and second regions and a bending region therebetween. The pixels are on a front surface of the base substrate in the first region and are spaced apart from the second region. A drive circuit is on the second region and is electrically connected with the display panel. First and second plates are on a rear surface of the base substrate and overlap at least a portion of the first and second regions, respectively. The first plate includes a first surface facing the bending region. The second plate includes a second surface facing the bending region. A reinforcing member is on the rear surface of the base substrate and covers at least a portion of at least one of the first and second surfaces.

19 Claims, 13 Drawing Sheets

DISPLAY DEVICE

CROSS-REFERENCE TO RELATED APPLICATIONS

This application claims priority under 35 U.S.C. § 119 to Korean Patent Application No. 10-2022-0159125, filed on Nov. 24, 2022 in the Korean Intellectual Property Office, the disclosure of which is incorporated by reference in its entirety herein.

TECHNICAL FIELD

Embodiments of the present disclosure relate to a display device, and more particularly, relate to a display device for preventing foreign matter from being generated in a bending region.

DISCUSSION OF RELATED ART

Display devices have been increasingly applied to a variety of different electronic devices, such as televisions, mobile phones, tablet computers, car navigation units, game machines, etc. To increase the portability and user convenience of the electronic device, a foldable or rollable display device including a flexible display member is being developed. However, foreign matter, such as sludge, may be generated in a bending region of the foldable or rollable display device, such as due to etching in the bending region during the manufacturing process.

The display device may include a support plate disposed under a display panel to increase the impact resistance of a display device.

SUMMARY

Embodiments of the present disclosure provide a display device for preventing foreign matter from being generated in a bending region. More particularly, embodiments of the present disclosure provide a display device for preventing sludge from being generated due to etching in a bending region.

Embodiments of the present disclosure provide a display device for increasing adhesion between a plate and a display panel. More particularly, embodiments of the present disclosure provide a display device including a reinforcing member for increasing adhesion between a base substrate and a plate.

Embodiments of the present disclosure provide a display device including a reinforcing member for alleviating stress in a bending region.

According to an embodiment, a display device includes a display panel including a base substrate and a plurality of pixels. The base substrate includes a first region, a second region, and a bending region between the first region and the second region. The plurality of pixels are disposed on a front surface of the base substrate in the first region and the plurality of pixels are spaced apart from the second region. A drive circuit is disposed on the second region and is electrically connected with the display panel. A first plate is disposed on a rear surface of the base substrate and overlaps at least a portion of the first region. The first plate includes a first surface facing towards the bending region. A second plate is disposed on the rear surface of the base substrate and overlaps at least a portion the second region. The second plate includes a second surface facing towards the bending region. A reinforcing member is disposed on the rear surface of the base substrate and covers at least a portion of at least one of the first surface and the second surface.

In an embodiment, a gap between the first surface and the second surface may vary in a direction toward the rear surface of the base substrate.

In an embodiment, the first surface may be spaced apart from a first boundary line positioned between the first region and the bending region by a predetermined distance. The second surface may be spaced apart from a second boundary line positioned between the second region and the bending region by a predetermined distance.

In an embodiment, a thickness of the reinforcing member may be less than thicknesses of the first plate and the second plate.

In an embodiment, the reinforcing member may have a strength that is less than strengths of the first plate and the second plate.

In an embodiment, the reinforcing member may not overlap the bending region.

In an embodiment, the first plate may include a first support surface that supports the display panel and a first opposite surface that faces away from the first support surface. The first surface may connect the first support surface and the first opposite surface to each other. The second plate may include a second support surface that supports the display panel and a second opposite surface that faces away from the second support surface. The second surface may connect the second support surface and the second opposite surface to each other. The reinforcing member may additionally cover at least a portion of the first opposite surface and at least a portion of the second opposite surface.

In an embodiment, the display device may further include a bending protection layer that covers the base substrate.

In an embodiment, the first plate and the second plate may include glass.

According to an embodiment, a display device includes a display panel including a first region, a second region, and a bending region between the first region and the second region. A first plate is disposed on a rear surface of the display panel and overlaps at least a portion of the first region. The first plate includes a first surface facing towards the bending region. A second plate is disposed on the rear surface of the display panel and overlaps at least a portion of the second region. The second plate includes a second surface facing towards the bending region. A reinforcing member is disposed on the rear surface of the display panel and covers at least a portion of at least one of the first surface and the second surface. A gap between the first surface and the second surface varies in a direction towards the display panel.

In an embodiment, the first plate may include a first contact surface that supports the display panel and a first opposite surface that faces away from the first contact surface. The first surface may connect the first contact surface and the first opposite surface to each other. The second plate may include a second contact surface that supports the display panel and a second opposite surface that faces away from the second contact surface. The second surface may connect the second contact surface and the second opposite surface to each other. The reinforcing member may additionally cover at least a portion of the first opposite surface and at least a portion of the second opposite surface.

In an embodiment, the first surface and the second surface may not overlap the bending region.

In an embodiment, a thickness of the reinforcing member may be less than thicknesses of the first plate and the second plate.

In an embodiment, the reinforcing member may have a strength that is less than strengths of the first plate and the second plate.

In an embodiment, a strength of the reinforcing member may be in a range of about 5% to about 20% of strengths of the first plate and the second plate.

In an embodiment, the reinforcing member may not overlap the bending region.

In an embodiment, the first plate and the second plate may include glass.

In an embodiment, the display device may further include a bending protection layer that covers the display panel.

According to an embodiment, a display device includes a display panel including a first region, a second region, and a bending region between the first region and the second region. A first plate is disposed on a rear surface of the display panel and overlaps the first region. The first plate includes a first surface facing towards the bending region. A second plate is disposed on the rear surface of the display panel and overlaps the second region. The second plate includes a second surface facing towards the bending region. A reinforcing member is disposed on the rear surface of the display panel and covers at least a portion of at least one of the first surface and the second surface. A gap between the first surface and the second surface decreases in a direction towards the display panel.

In an embodiment, the first surface may be spaced apart from a first boundary line positioned between the first region and the bending region by a predetermined distance, and the second surface may be spaced apart from a second boundary line positioned between the second region and the bending region by a predetermined distance.

BRIEF DESCRIPTION OF THE DRAWINGS

The above and other objects and features of the present disclosure will become apparent by describing in detail embodiments thereof with reference to the accompanying drawings.

DETAILED DESCRIPTION OF EMBODIMENTS

Figure 1:
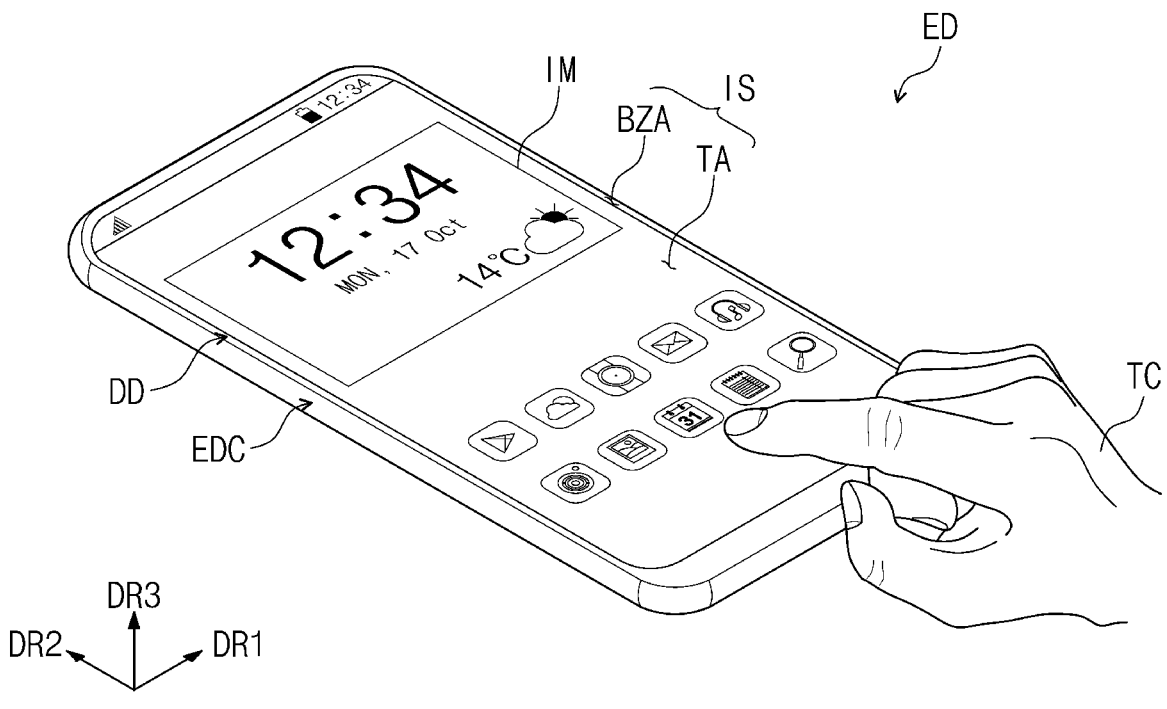
FIG. 1 is a perspective view of an electronic device according to an embodiment of the present disclosure.

In this specification, when a component (or, a region, a layer, a part, etc.) is referred to as being "on", "connected to" or "coupled to" another component, this means that the component may be directly on, connected to, or coupled to the other component or a third component may be present therebetween. When a component (or, a region, a layer, a part, etc.) is referred to as being "directly on", "directly connected to" or "directly coupled to" another component, no intervening components may be present.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not necessarily be limited by the terms. The terms may be used only for distinguishing one component from other components. For example, without departing the scope of embodiments of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

Figure 2:
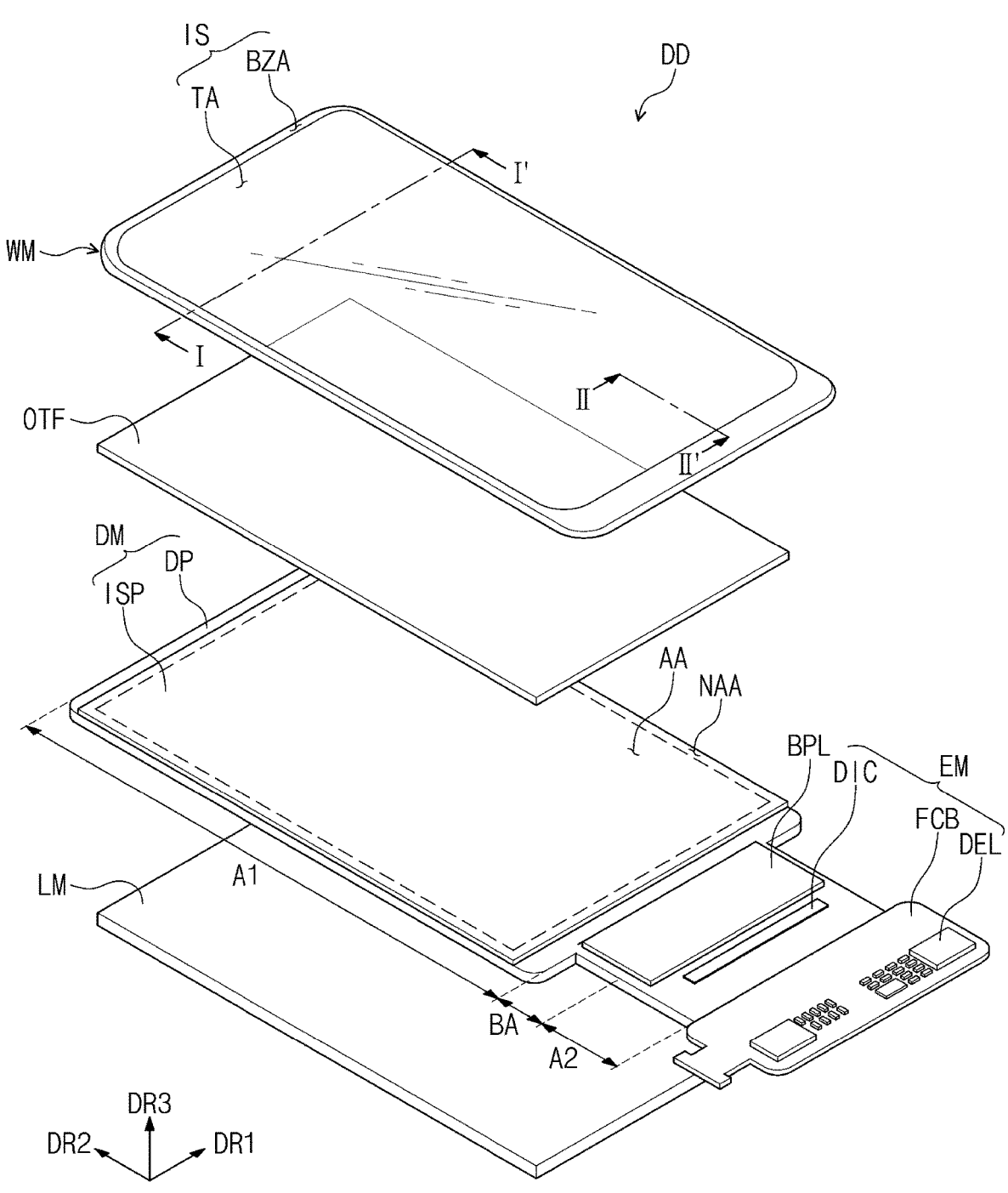
FIG. 2 is an exploded perspective view of a display device according to an embodiment of the present disclosure.
Figure 3:
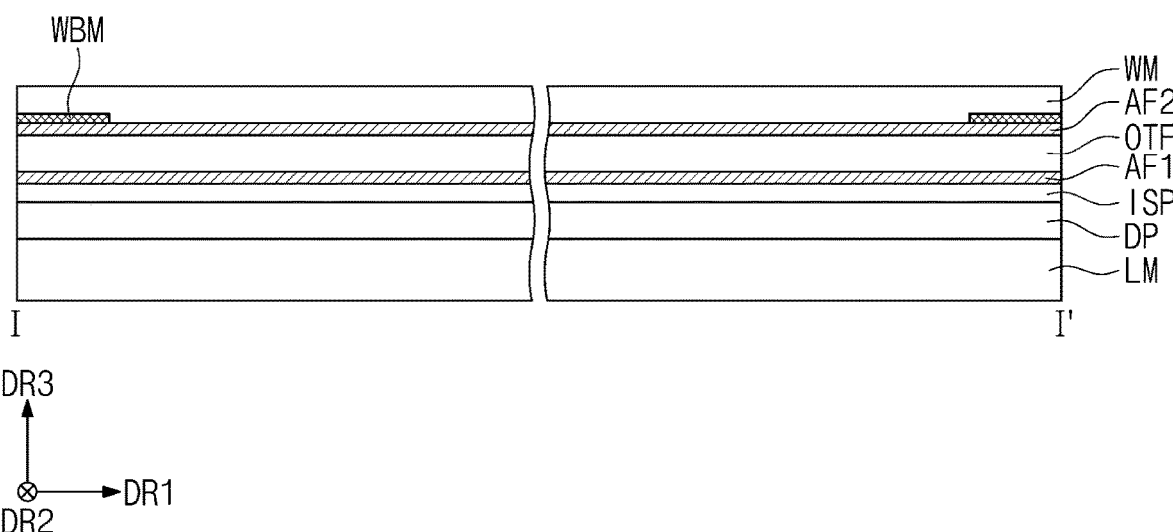
FIG. 3 is a cross-sectional view taken along line I-I' illustrated in FIG. 2 according to an embodiment of the present disclosure.

FIG. 1 is a perspective view of an electronic device according to an embodiment of the present disclosure, and FIG. 2 is an exploded perspective view of a display device according to an embodiment of the present disclosure. FIG. 3 is a cross-sectional view taken along line I-I' illustrated in FIG. 2.

Referring to FIGS. 1 to 3, the electronic device ED may be a device activated in response to an electrical signal. In embodiments of the present disclosure, the electronic device ED may be various electronic devices, such as a smart watch, a tablet computer, a notebook computer, a computer, a smart television, or the like. However, embodiments of the present disclosure are not necessarily limited thereto.

The electronic device ED may display an image IM in a third direction DR3 on a display surface IS defined in a plane extending in a first direction DR1 and a second direction DR2. The display surface IS, on which the image IM is displayed, may correspond to a front surface of the electronic device ED. In some embodiments, the image IM may include at least one still image and/or at least one dynamic image.

In this embodiment, front surfaces (e.g., upper surfaces) and rear surfaces (e.g., lower surfaces) of members are defined with respect to the third direction DR3 in which the image IM is displayed. The front surfaces and the rear surfaces may be opposite each other in the third direction DR3, and the normal directions of the front surfaces and the rear surfaces may be parallel to the third direction DR3.

The separation distance between the front surface and the rear surface of the electronic device ED in the third direction DR3 may correspond to the thickness of the electronic device ED in the third direction DR3. However, the directions indicated by the first to third directions DR1, DR2, and DR3 may be relative concepts and may be changed to different directions.

The electronic device ED according to an embodiment of the present disclosure may detect an input TC of a user applied from the outside. The input TC of the user includes various forms of external inputs such as a part of the user's body, light, heat, pressure, and the like. In addition, the electronic device ED may detect a proximate or adjacent input as well as an input in direct contact with the electronic device ED.

In an embodiment shown in FIG. 1, the input TC of the user is illustrated as the user's hand applied to the front surface. However, embodiments of the present disclosure are not necessarily limited thereto and the input TC of the user may be provided in various forms as described above. Furthermore, in some embodiments the electronic device ED may detect the input TC of the user applied to a side surface or a rear surface of the electronic device ED depending on the structure of the electronic device ED, and is not necessarily limited to any one embodiment.

The front surface of the electronic device ED may be divided into a transmissive region TA and a bezel region BZA. The transmissive region TA may be a region where the image IM is displayed. The user visually recognizes the image IM through the transmissive region TA. In an embodiment of FIG. 1, the transmissive region TA is illustrated as having a rounded quadrangular shape. However, embodiments of the present disclosure are not necessarily limited thereto and the transmissive region TA may have various shapes.

The bezel region BZA is adjacent to the transmissive region TA (e.g., in the first and/or second directions DR1, DR2). In an embodiment, the bezel region BZA may have a predetermined color, such as a black color. The bezel region BZA may surround the transmissive region TA (e.g., in the first and/or second directions DR1, DR2). Accordingly, the shape of the transmissive region TA may be substantially defined by the bezel region BZA. However, embodiments of the present disclosure are not necessarily limited thereto and the bezel region BZA may not be disposed adjacent to at least one side of the transmissive region TA in some embodiments, or may be omitted altogether.

In an embodiment, the electronic device ED may include the display device DD and an external case EDC. The display device DD may include a window WM, a display module DM, a drive module EM, an optical film OTF, and a lower module LM.

The window WM may be formed of a transparent material through which an image is able to be output. For example, in an embodiment the window WM may be formed of glass, sapphire, plastic, or the like. Although the window WM is illustrated as a single layer, the window WM is not necessarily limited thereto and may include a plurality of layers in some embodiments. In an embodiment, the above-described bezel region BZA of the display device DD may be substantially provided as a region in which a material including a predetermined color is printed on one region of the window WM. In an embodiment of the present disclosure, the window WM may include a bezel pattern WBM (FIG. 3) for defining the bezel region BZA. In an embodiment, the bezel pattern WBM may be a colored organic film and may be formed by, for example, a coating method.

The display module DM may include a display panel DP and an input sensing layer ISP. The display panel DP according to an embodiment of the present disclosure may be an emissive display panel. However, embodiments of the present disclosure are not necessarily limited thereto. For example, in some embodiments the display panel DP may be an organic light emitting display panel, an inorganic light emitting display panel, or a quantum-dot light emitting display panel. An emissive layer of the organic light emitting display panel may include an organic light emitting material, and an emissive layer of the inorganic light emitting display panel may include an inorganic light emitting material. An emissive layer of the quantum-dot light emitting display panel may include quantum dots and quantum rods. Hereinafter, the display panel DP will be described as an organic light emitting display panel for convenience of explanation.

The input sensing layer ISP may be directly disposed on the display panel DP. According to an embodiment of the present disclosure, the input sensing layer ISP may be formed on the display panel DP by a continuous process. For example, in an embodiment in which the input sensing layer ISP is disposed directly on the display panel DP, an adhesive film is not disposed between the input sensing layer ISP and the display panel DP.

The display panel DP generates the image IM, and the input sensing layer ISP obtains coordinate information of an external input (e.g., a touch event).

The optical film OTF decreases the reflectivity of external light incident from above the window WM. The optical film OTF according to an embodiment of the present disclosure may include a phase retarder and a polarizer. In an embodiment, the phase retarder may be of a film type or a liquid-crystal coating type and may include a $\lambda/2$ phase retarder and/or a $\lambda/4$ phase retarder. The polarizer may also be of a film type or a liquid-crystal coating type. In an embodiment, the film type may include a stretchable synthetic resin film, and the liquid-crystal coating type may include liquid crystals arranged in a predetermined arrangement. The phase retarder and the polarizer may be implemented with one polarizer film. The optical film OTF may further include a protective film disposed on or under the polarizer film.

The optical film OTF may be disposed on the input sensing layer ISP. For example, the optical film OTF may be disposed between the input sensing layer ISP and the window WM (e.g., in the third direction DR3). In an embodiment, the input sensing layer ISP, the optical film OTF, and the window WM may be coupled together through adhesive films. For example, in an embodiment as shown in FIG. 3, a first adhesive film AF1 is disposed between the input sensing layer ISP and the optical film OTF, and a second adhesive film AF2 is disposed between the optical film OTF and the window WM. Accordingly, the optical film OTF is coupled to the input sensing layer ISP by the first adhesive film AF1, and the window WM is coupled to the optical film OTF by the second adhesive film AF2.

In an embodiment of the present disclosure, each of the first and second adhesive films AF1 and AF2 may include an optically clear adhesive (OCA) film. However, embodiments of the present disclosure are not necessarily limited thereto and the first and second adhesive films AF1 and AF2 may include a general adhesive or sticky substance. For example, each of the first and second adhesive films AF1 and AF2 may independently include a pressure sensitive adhesive (PSA), an optically clear adhesive (OCA), or an optically clear resin (OCR).

In addition to the optical film OTF, functional layers for performing other functions, for example, a protective layer may be additionally disposed between the display module DM and the window WM.

The display module DM may display the image IM and may detect the external input TC. For example, the display module DM may display an image in response to an electrical signal and may transmit/receive information about an external input. The display module DM may be defined as an active region AA and a peripheral region NAA. In this embodiment, the active region AA may be a region where the image IM is displayed and may be a region where the external input TC is simultaneously detected. However, embodiments of the present disclosure are not necessarily limited thereto. For example, in some embodiments a region where the image IM is displayed and a region where the external input TC is detected may be separated from each other in the active region AA.

The peripheral region NAA is adjacent to the active region AA. For example, the peripheral region NAA may surround the active region AA. However, this is illustrative, and the peripheral region NAA may be defined in various shapes and is not necessarily limited to any one embodiment. According to an embodiment, the active region AA of the display module DM may correspond to at least a portion of the transmissive region TA.

Various signal lines or pads that provide electrical signals to the active region AA, electronic elements, or the like may be disposed in the peripheral region NAA. The peripheral region NAA may be covered by the bezel region BZA and may not be visible from the outside.

According to an embodiment of the present disclosure, the display module DM may include a first region A1, a bending region BA, and a second region A2 that are consecutively arranged in the direction opposite to the second direction DR2. As shown in an embodiment of FIG. 4, the first region A1 may be a region corresponding to the display surface IS. The bending region BA and the second region A2 may be regions corresponding to the peripheral region NAA. The bending region BA may be bent about a bending axis BX (FIG. 7A), and the first region A1 and the second region A2 may be non-bending regions. For example, in a state in which the display module DM is bent, the bending region BA may be a region that is deformed to be bent by an external force, and the first region A1 and the second region A2 may be regions that are not deformed by the external force.

In an embodiment, the lengths of the bending region BA and the second region A2 in the first direction DR1 may be less than or equal to the length of the first region A1 in the first direction DR1. A region having a relatively small length in the direction of the bending axis BX may be more easily bent.

Figure 6:
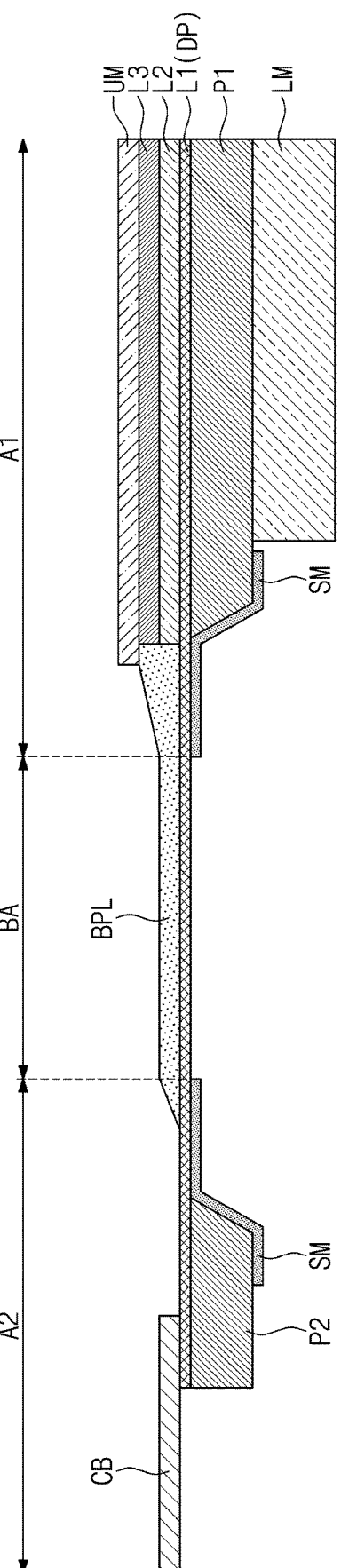
FIG. 6 is a partial cross-sectional view of a display device according to an embodiment of the present disclosure.
Figure 6:
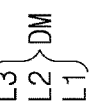
Figure 6:
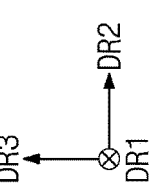

As shown in an embodiment of FIG. 6, the display device DD may further include a bending protection layer BPL disposed on the bending region BA of the display module DM. In an embodiment, the bending protection layer BPL may be additionally disposed on a portion of the first region A1 and a portion of the second region A2. The bending protection layer BPL may be bent together with the bending region BA. The bending protection layer BPL protects the bending region BA from an external impact and controls a neutral plane of the bending region BA. The bending protection layer BPL controls stress in the bending region BA such that the neutral plane approaches signal lines disposed in the bending region BA.

The drive module EM may control driving of the display module DM. In an embodiment as shown in FIG. 2, the drive module EM may include a flexible circuit film FCB and a driver IC DIC. The flexible circuit film FCB may be electrically connected with the display panel DP. In an embodiment, the flexible circuit film FCB may be coupled to an end of the second region A2 of the display module DM through a bonding process. The flexible circuit film FCB may be electrically connected to the display panel DP through an anisotropic conductive adhesive layer. However, embodiments of the present disclosure are not necessarily limited thereto. The driver IC DIC may be mounted on the second region A2 of the display module DM. The driver IC DIC may include drive circuits for driving pixels of the display panel DP, for example, a data drive circuit.

The drive module EM may further include a plurality of drive elements DEL mounted on the flexible circuit film FCB. The plurality of drive elements DEL may include a circuit for converting a signal input from the outside into a signal required for the driver IC DIC or a signal required for driving the display module DM. When the bending region BA of the display module DM is bent, the flexible circuit film FCB may be disposed under the display module DM.

The lower module LM is disposed on the rear surface of the display module DM. The lower module LM disposed on the rear surface of the display module DM may increase the impact resistance of the display device DD. In an embodiment, the lower module LM may be fixed to the rear surface of the display module DM through an adhesive film. For example, the adhesive film may be a pressure sensitive adhesive (PSA), an optical clear adhesive (OCA), or an optical clear resin (OCR). When the bending region BA of the display module DM is bent, the second region A2 of the display module DM and the flexible circuit film FCB may be disposed on the rear surface of the lower module LM.

The external case EDC accommodates the display device DD. The external case EDC may be coupled with the window WM and may define the exterior of the electronic device ED. The external case EDC protects components accommodated therein, by absorbing an impact applied from the outside and preventing infiltration of foreign matter/moisture into the electronic device ED. In some embodiments of the present disclosure, the external case EDC may be provided in a form in which a plurality of receiving members are coupled.

Figure 4:
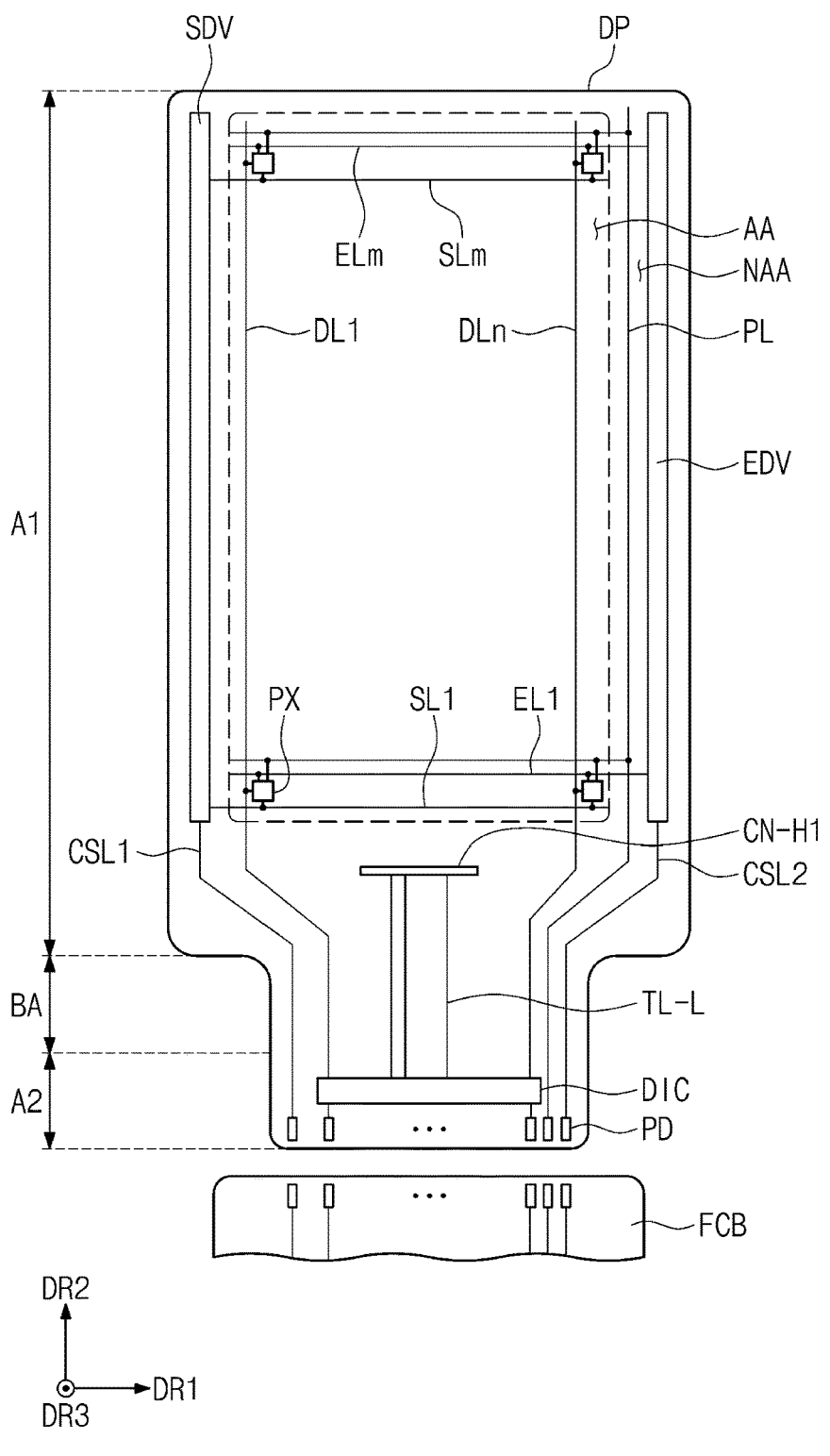
FIG. 4 is a plan view of a display panel according to an embodiment of the present disclosure.

FIG. 4 is a plan view of the display panel according to an embodiment of the present disclosure.

Referring to FIGS. 2 and 4, the display panel DP according to an embodiment of the present disclosure may be divided into a first region A1, a bending region BA, and a second region A2. The first region A1, the bending region BA, and the second region A2 of the display panel DP illustrated in an embodiment of FIG. 4 correspond to the first region A1, the bending region BA, and the second region A2 of the display module DM described above with reference to an embodiment of FIG. 2. The expression "one region/portion corresponds to another region/portion" used herein means that the regions/portions overlap each other and is not necessarily limited to having the same area.

The display panel DP according to an embodiment may include an active region AA where pixels PX are disposed and a peripheral region NAA adjacent to the active region AA (e.g., in the first and/or second directions DR1, DR2). The active region AA and the peripheral region NAA correspond to the active region AA and the peripheral region NAA described above with reference to FIG. 2. The active region AA corresponds to the region where the pixels PX are disposed in the first region A1, and the peripheral region NAA includes the bending region BA, the second region A2, and the remainder of the first region A1 other than the region where the pixels PX are disposed.

In an embodiment, the display panel DP may include a scan driver SDV, an emission driver EDV, and the driver IC DIC in the peripheral region NAA. The driver IC DIC may be a data driver.

The display panel DP may include the plurality of pixels PX, a plurality of scan lines SL1 to SLm, a plurality of data lines DL1 to DLn, a plurality of emission lines EL1 to ELm, first and second control lines CSL1 and CSL2, a power line PL, and a plurality of pads PD in which "m" and "n" are natural numbers. The pixels PX may be connected to the scan lines SL1 to SLm, the data lines DL1 to DLn, and the emission lines EL1 to ELm.

The scan lines SL1 to SLm may extend in the first direction DR1 and may be arranged in the second direction DR2. The scan lines SL1 to SLm may be connected to the scan driver SDV. The data lines DL1 to DLn may extend in the second direction DR2 and may be arranged in the first direction DR1. The data lines DL1 to DLn may be connected to the driver IC DIC disposed in the second region A2 via the bending region BA from the first region A1. The emission lines EL1 to ELm may extend in the first direction DR1 and may be arranged in the second direction DR2. The emission lines EL1 to ELm may be connected to the emission driver EDV.

In an embodiment, the power line PL may include a portion extending in the first direction DR1 and a portion extending in the second portion DR2. The portion extending in the first direction DR1 and the portion extending in the second portion DR2 may be disposed on different layers from each other. The portion of the power line PL that extends in the second direction DR2 may extend from the first region A1 to the second region A2 via the bending region BA. The power line PL may provide a reference voltage to the pixels PL.

The first control line CSL1 may be connected to the scan driver SDV and may extend from the first region A1 to the second region A2 via the bending region BA. The second control line CSL2 may be connected to the emission driver EDV and may extend from the first region A1 to the second region A2 via the bending region BA.

The pads PD may be disposed adjacent to an end of the second region A2 (e.g., a lower end of the second region A2 in the second direction DR2). The driver IC DIC, the power line PL, the first control line CSL1, and the second control line CSL2 may be connected to the pads PD. The flexible circuit film FCB may overlap the end of the second region A2 of the display panel DP and may be disposed on the display panel DP. The flexible circuit film FCB may include pads corresponding to the pads PD and may be electrically connected to the pads PD through an anisotropic conductive adhesive layer.

The display panel DP according to an embodiment may include a first contact CN-H1 defined in the first region A1. The display panel DP may include extended sensing lines TL-L extending from the first contact CN-H1 to the second region A2 via the first region A1 and the bending region BA. In an embodiment shown in FIG. 4, for ease of description, the first contact is illustrated in a single shape, such as a line shape. However, the first contact may substantially include a plurality of contacts to which the respective extended sensing lines are connected. For example, in some embodiments the first contact may include as many contacts as the extended sensing lines, and the extended sensing lines TL-L may be connected with corresponding sensing lines among sensing lines TL1, TL2, and TL3 to be described below in a one-to-one manner through corresponding contacts.

In FIG. 4, the extended sensing lines TL-L are illustrated as being disposed between the data lines DL1 to DLn. However, without necessarily being limited thereto, the data lines DL1 to DLn may be disposed between the extended sensing lines TL-L. Accordingly, a plurality of first contacts CN-H1 may be provided with the data lines DL1 to DLn therebetween. However, embodiments of the present disclosure are not necessarily limited thereto.

Figure 5:
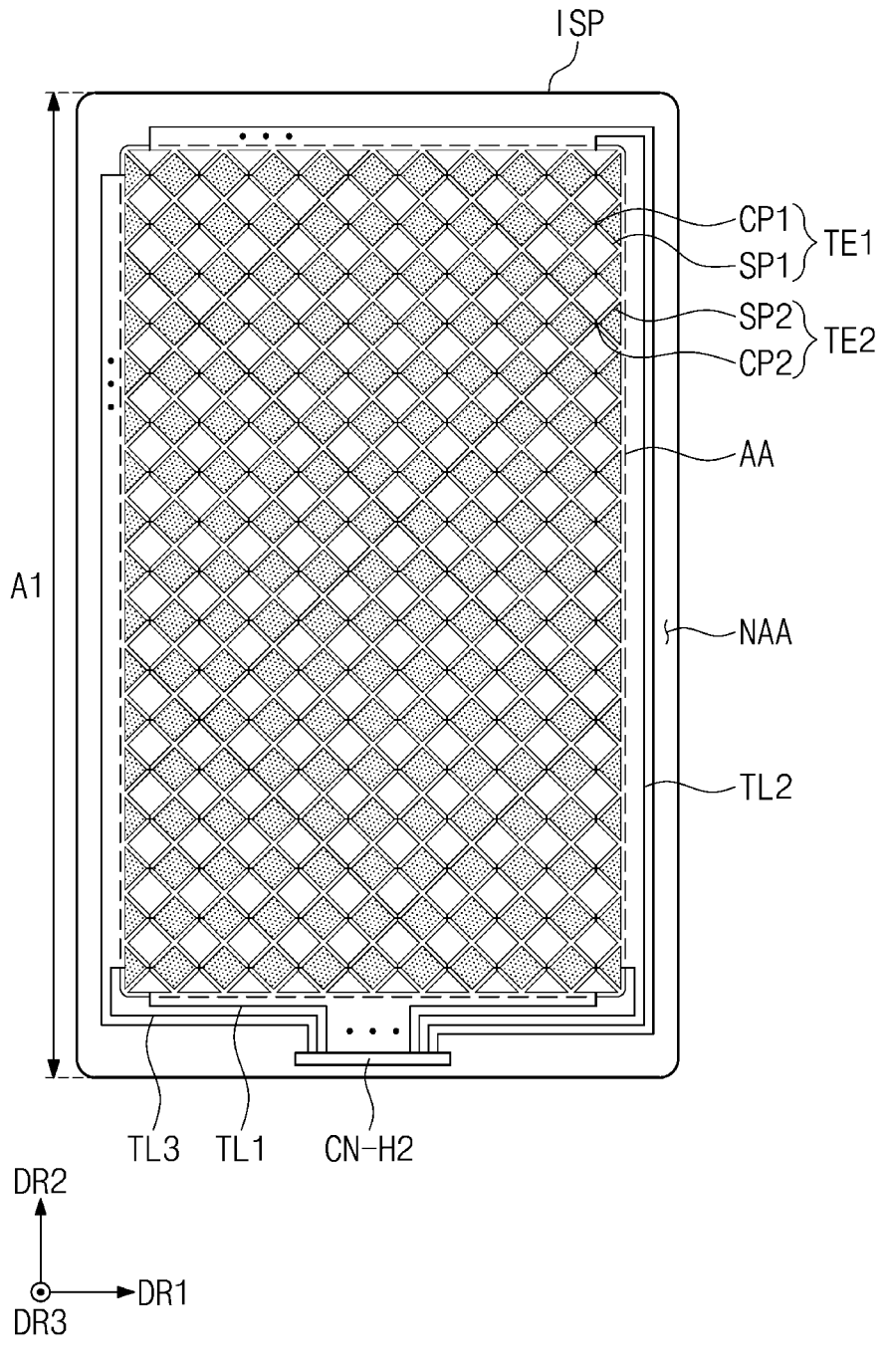
FIG. 5 is a plan view of an input sensing layer according to an embodiment of the present disclosure.

FIG. 5 is a plan view of the input sensing layer according to an embodiment of the present disclosure.

Referring to FIG. 5, the input sensing layer ISP according to an embodiment may include sensing electrodes, such as first and second sensing electrodes TE1 and TE2 and the sensing lines, such as first to third sensing lines TL1, TL2, and TL3. In an embodiment in which the input sensing layer ISP is directly disposed on the display panel DP by a continuous process, the input sensing layer ISP may be formed only on a region overlapping the first region A1 of the display panel DP.

In an embodiment, the input sensing layer ISP may obtain information about an external input through a change in mutual capacitance between the first sensing electrodes TE1 and the second sensing electrodes TE2. The first sensing electrodes TE1 are arranged in the first direction DR1, and each of the first sensing electrodes TE1 extends in the second direction DR2. Each of the first sensing electrodes TE1 may include first sensing patterns SP1 and first connecting patterns CP1.

The first sensing patterns SP1 are disposed in the active region AA. The first sensing patterns SP1 may have a rhombic shape. However, embodiments of the present disclosure are not necessarily limited thereto and the first sensing patterns SP1 may have various shapes.

The first connecting patterns CP1 are disposed in the active region AA. Each of the first connecting patterns CP1 may be disposed between the first sensing patterns adjacent to each other. The first connecting patterns CP1 and the first sensing patterns SP1 may be disposed on different layers and may be connected through contacts.

The second sensing electrodes TE2 are arranged in the second direction DR2, and each of the second sensing electrodes TE2 extends in the first direction DR1. Each of the second sensing electrodes TE2 may include second sensing patterns SP2 and second connecting patterns CP2.

The second sensing patterns SP2 may be spaced apart from the first sensing patterns SP1. The first sensing patterns SP1 and the second sensing patterns SP2 may transmit and receive independent electrical signals without making contact with each other.

In an embodiment, the second sensing patterns SP2 may have the same shape as the first sensing patterns SP1. For example, the second sensing patterns SP2 may have a rhombic shape. However, embodiments of the present disclosure are not necessarily limited thereto, and the second sensing patterns SP2 may have various shapes.

Each of the second connecting patterns CP2 may be disposed between the second sensing patterns SP2 adjacent to each other. For convenience of description, each of the second sensing electrodes TE2 has been described as being divided into the second sensing patterns SP2 and the second connecting patterns CP2. However, the second sensing electrode TE2 may be substantially provided in one pattern.

According to an embodiment, the second sensing electrodes TE2 may be disposed on the same layer as the first sensing patterns SP1, and in this embodiment, the first sensing patterns SP1 and the second sensing electrodes TE2 may be provided as a plurality of mesh lines extending in an oblique direction with respect to each of the first direction DR1 and the second direction DR2.

The first to third sensing lines TL1, TL2, and TL3 are disposed in the peripheral region NAA. The sensing lines may include the first sensing lines TL1, the second sensing lines TL2, and the third sensing lines TL3.

The first sensing lines TL1 are connected to the first sensing electrodes TE1, respectively. In an embodiment shown in FIG. 5, the first sensing lines TL1 are connected to lower ends of the first sensing electrodes TE1, respectively (e.g., in the second direction DR2). The second sensing lines TL2 are connected to upper ends of the first sensing electrodes TE1, respectively (e.g., in the second direction DR2). According to an embodiment of the present disclosure, the first sensing electrodes TE1 may be connected to the first sensing lines TL1 and the second sensing lines TL2. Accordingly, sensitivities depending on regions may be uniformly maintained for the first sensing electrodes TE1 which are longer than the second sensing electrodes TE2.

However, embodiments of the present disclosure are not necessarily limited thereto. For example, in an embodiment, the input sensing layer ISP may be omitted altogether.

The third sensing lines TL3 are connected to ends of the second sensing electrodes TE2, respectively. In this embodiment, the third sensing lines TL3 are connected to left ends of the second sensing electrodes TE2, respectively (e.g., in the first direction DR1). However, embodiments of the present disclosure are not necessarily limited thereto.

Referring to FIGS. 4 and 5, the input sensing layer ISP may include a second contact CN-H2 overlapping the peripheral region NAA. The second contact CN-H2 may overlap the first contact CN-H1 of the display panel DP (e.g., in the third direction DR3). The first to third sensing lines TL1, TL2, and TL3 may be connected with the corresponding extended sensing lines TL-L through the second contact CN-H2 defined in the input sensing layer ISP and the first contact CN-H1 defined in the display panel DP. Accordingly, the first and second sensing electrodes TE1 and TE2 may be electrically connected to the flexible circuit film FCB.

Figure 7A:
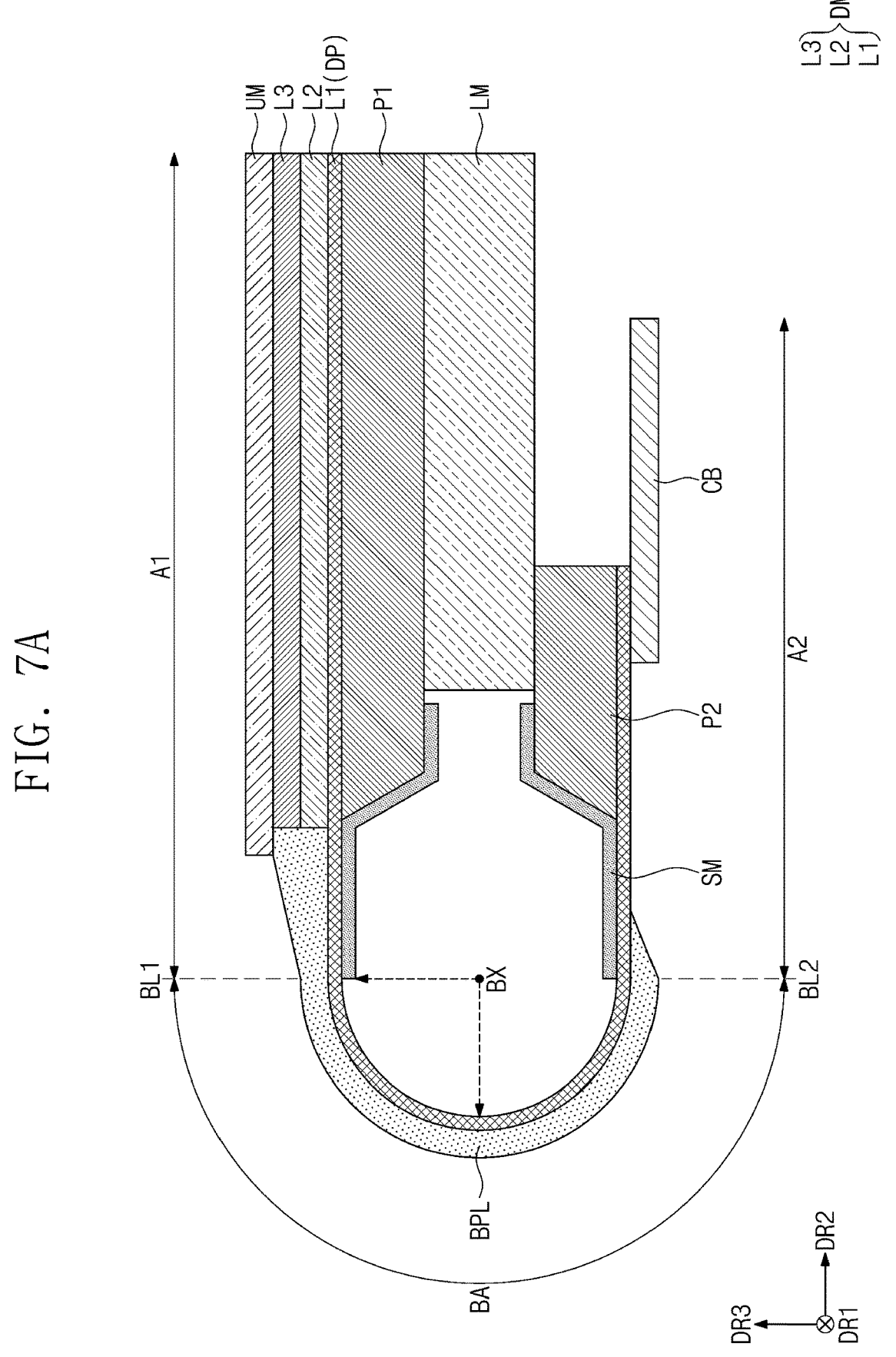
FIGS. 7A and 7B are partial cross-sectional views of the display device according to embodiments of the present disclosure.
Figure 7B:
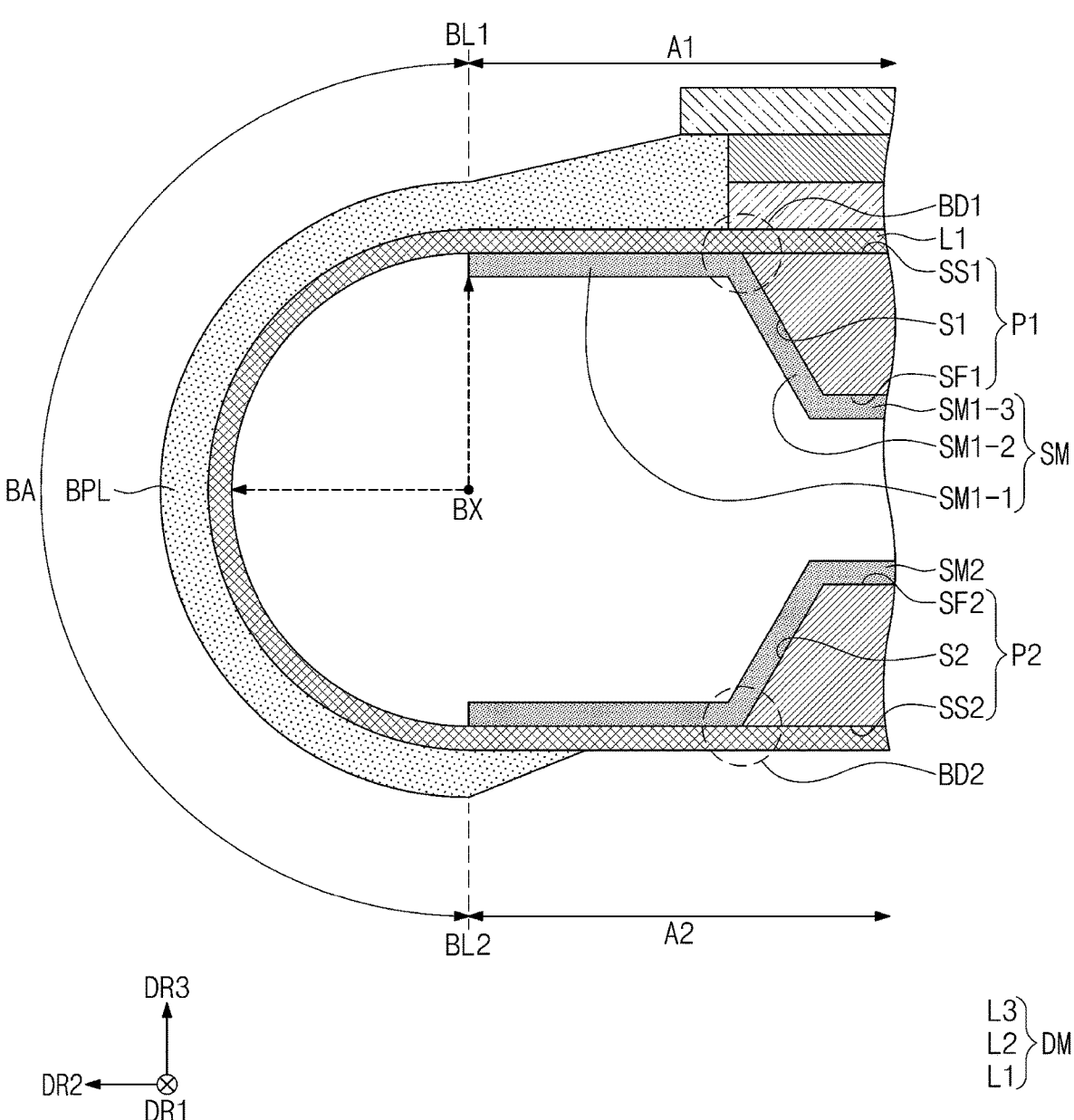

FIGS. 6, 7A, and 7B are partial cross-sectional views of a display device according to embodiments of the present disclosure.

FIG. 6 illustrates a flat state in which a display module DM is not bent. FIG. 7A illustrates a state in which a bending region BA of the display module DM is bent. FIG. 7B is an enlarged view of a portion of FIG. 7A.

Referring to FIGS. 6, 7A, and 7B, the display device includes an upper member UM, the display module DM, a lower member LM, and a drive circuit CB. The upper member UM collectively refers to components disposed on an upper side of the display module DM (e.g., in the third direction DR3). The lower member LM collectively refers to components disposed on a lower side of the display module DM (e.g., in the third direction DR3). For example, in an embodiment the upper member UM may include a window, an upper film, and the like. For example, in an embodiment the lower member LM may include a lower protective film, a support layer, and a cover layer. In some embodiments, the lower member LM may further include a digitizer, an electromagnetic shielding layer, a metal layer, and the like. The lower member LM of FIG. 6 may correspond to the lower module LM of FIG. 3, which is the same in the drawings below.

The display module DM may include a plurality of layers L1, L2, and L3. For example, the plurality of layers L1, L2, and L3 may be sequentially comprised of the display panel DP of FIG. 2, the input sensing layer ISP of FIG. 2, the optical film OTF of FIG. 2, and the window WM of FIG. 2. However, embodiments of the present disclosure are not necessarily limited thereto. Furthermore, the positions of the plurality of layers L1, L2, and L3 are not necessarily limited to the positions illustrated in the drawings and may vary depending on the design of the display module DM and a product in which the display module DM is used.

Each of the plurality of layers L1, L2, and L3 may be a single layer. However, embodiments of the present disclosure are not necessarily limited thereto, and one or more of the plurality of layers L1, L2, and L3 may include a plurality of layers.

For convenience of description, it will be exemplified that the plurality of layers L1, L2, and L3 are a base substrate L1, which is a portion of a display panel DP, an input sensing layer L2, and an optical film L3. However, embodiments of the present disclosure are not necessarily limited thereto and the plurality of layers L1, L2, and L3 may vary.

The bending region BA may be bent such that a front surface of the base substrate) L1 is concave or a rear surface of the base substrate L1 is concave. For example, in an embodiment the bending area BA may be bent to be convex towards the outside of the display panel DP. The bending region BA may be bent with a predetermined curvature. Since a second region A2 is disposed under a first region A1, the drive circuit CB may be disposed under the second region A2. Since the bending region BA is bent to be convex towards the outside of the display panel DP, the area of a peripheral region NAA viewed from the front of the display panel DP may be decreased. Accordingly, a bezel region BZA may be reduced, and thus the aesthetics of an electronic device may be increased.

The display device may include a bending protection layer BPL. The bending protection layer BPL may be disposed on the bending region BA (e.g., an entirety of the bending region BA), a portion of the first region A1 adjacent to the bending region BA, and a portion of the second region A2 adjacent to the bending region BA. For example, the bending protection layer BPL may continuously extend from the portion of the first region A1 adjacent to the bending region BA to the portion of the second region A2 adjacent to the bending region BA via the bending region BA.

In an embodiment, such as depending on design conditions of the display device, the bending protection layer BPL may be brought into close contact with (e.g., direct contact therewith), or spaced apart from, the input sensing layer L2 and the optical film L3 in the first region A1. Furthermore, the bending protection layer BPL may be brought into close contact with (e.g., directly contact therewith), or spaced apart from, the drive circuit CB in the second region A2. In the drawings, the bending protection layer BPL is illustrated as being brought into direct contact with the input sensing layer L2 and the optical film L3 and spaced apart from the drive circuit CB. However, embodiments of the present disclosure are not necessarily limited thereto.

In an embodiment, the bending protection layer BPL may include an acrylate-based resin or a urethane-based resin. The bending protection layer BPL may be bent together with the bending region BA.

In an embodiment, the bending protection layer BPL may serve to protect the bending region BA. The bending protection layer BPL may cover and protect lines disposed in the bending region BA. The bending protection layer BPL may supplement the stiffness of the bending region BA and may prevent a crack in the bending region BA when the bending region BA is bent. The bending protection layer BPL may protect the bending region BA from an external impact.

The drive circuit CB may be electrically connected with the display module DM. According to an embodiment of the present disclosure, the drive circuit CB may be disposed in the second region A2. The bending region BA may be bent such that the second region A2 is disposed under the first region A1. Accordingly, the drive circuit CB may be disposed under the first region A1 (e.g., in the third direction DR3). In an embodiment, the drive circuit CB may be the flexible circuit film FCB or the driver IC DIC described above in an embodiment of FIG. 2.

A plate may be disposed on the rear surface of the base substrate L1. In an embodiment, the base substrate L1 may include polyimide film. However, embodiments of the present disclosure are not necessarily limited thereto and the material(s) of the base substrate L1 may vary. For example, the base substrate L1 may be applied to the plate through a laminating method. However, without necessarily being limited thereto, the base substrate L1 may be located on the plate through various methods. The plate may alleviate a force (e.g., strain) applied due to bending in the bending region BA of the base substrate L1. In an embodiment, the plate may have a thickness in a range of about 2 mm to about 5 mm. In an embodiment, the plate may have a thickness that is about 2 mm or less.

The plate may include a first plate P1 and a second plate P2. The first plate P1 may overlap at least a portion of the first region A1, and the second plate P2 may overlap at least a portion the second region A2. The thicknesses and lengths of the first plate P1 and the second plate P1 may be the same as, or different from, each other. The first plate P1 and the second plate P2 may alleviate a force applied to the base substrate L1.

The first plate P1 and the second plate P2 may be spaced apart from each other by a predetermined gap. According to an embodiment of the present disclosure, the first plate P1 and the second plate P2 may be spaced apart from each other with the bending region BA therebetween. For example, the first plate P1 and the second plate P2 may not overlap the bending region BA.

In an embodiment, the first plate P1 and the second plate P2 may be components formed from the same plate, and the plate may be divided into the first plate P1 and the second plate P2 by removal of a portion overlapping the bending region BA.

According to an embodiment of the present disclosure, the first plate P1 and the second plate P2 may not overlap the bending region BA. Since the first plate P1 and the second plate P2 are not disposed in the bending region BA, an increase in the thickness of the region where the bending region BA is disposed may be prevented. Accordingly, the bending region BA may be more easily bent.

The first plate P1 may include a first support surface SS1, a first opposite surface SF1, and a first connecting surface S1. The first support surface SS1 may support the base substrate L1 and may be a contact surface. The first opposite surface SF1 may face away from the first support surface SS1, and the first connecting surface S1 may connect the first support surface SS1 and the first opposite surface SF1. For example, as shown in an embodiment of FIG. 7B, the first support surface SS1 and the first opposite surface SF1 may extend in the second direction DR2 and may be spaced apart from each other in the third direction DR3. The first connecting surface S1 may extend in a direction between the first and second directions DR1, DR2 to connect the first support surface SS1 and the first opposite surface SF1. The second plate P2 may include a second support surface SS2, a second opposite surface SF2, and a second connecting surface S2. The second support surface SS2 may support the base substrate L1 and may be a contact surface. The second opposite surface SF2 may face away from the second support surface SS2, and the second connecting surface S2 may connect the second support surface SS2 and the second opposite surface SF2 to each other. For example, as shown in an embodiment of FIG. 7B, the second support surface SS2 and the second opposite surface SF2 may extend in the second direction DR2 and may be spaced apart from each other in the third direction DR3. The second connecting surface S2 may extend in a direction between the first and second directions DR1, DR2 to connect the second support surface SS2 and the second opposite surface SF2 to each other.

The first plate P1 may include a first surface S1 facing towards the bending region BA. The second plate P2 may include a second surface S2 facing towards the bending region BA. The first surface S1 is the above-described first connecting surface S1, and the second surface S2 is the above-described second connecting surface S2.

The gap between the first surface S1 and the second surface S2 may vary in a direction towards the rear surface of the base substrate L1, such as when the display module is in an unbent state. In an embodiment, the gap (G12 of FIG. 8B) between the first surface S1 and the second surface S2 may decrease in the direction towards the rear surface of the base substrate L1, such as when the display module is in an unbent state. The gap between the first surface S1 and the second surface S2 may vary depending on a design value of a product and the curvature of the bending region BA.

The first surface S1 may be inclined towards the bending region BA from the rear surface of the base substrate L1, and the second surface S2 may be inclined towards the bending region BA from the rear surface of the base substrate L1.

The first surface S1 may overlap the first region A1, and according to an embodiment of the present disclosure, the first surface S1 may not overlap the bending region BA. The second surface S2 may overlap the second region A2, and according to an embodiment of the present disclosure, the second surface S2 may not overlap the bending region BA. However, embodiments of the present disclosure are not necessarily limited thereto and at least one of the first surface S1 and the second surface S2 may at least partially overlap the bending region BA in some embodiments.

A reinforcing member SM may be disposed on the rear surface of the base substrate L1. The reinforcing member SM may cover at least a portion of one of the first plate P1 and the second plate P2. For example, in an embodiment the reinforcing member SM may cover at least a portion of only the first plate P1, or may cover at least a portion of only the second plate P2. However, embodiments of the present disclosure are not necessarily limited thereto, and the reinforcing member SM may cover at least a portion of both the first plate P1 and the second plate P2. For example, as shown in an embodiment of FIG. 7A, the reinforcing member SM may cover an entirety of the first and s In an embodiment, the reinforcing member SM may be in direct contact with a portion of the first plate P1 and a portion of the second plate P2.

The reinforcing member SM may support the base substrate L1. The reinforcing member SM may be brought into direct contact with a portion of the base substrate L1.

In an embodiment, the reinforcing member SM may be brought into close contact or direct contact with the first plate P1, the second plate P2, and the base substrate L1. At an end BD1 of an interface between the first plate P1 and the base substrate L1 and an end BD2 of an interface between the second plate P2 and the base substrate L1, the reinforcing member SM may be brought into direct contact with the first plate P1, the second plate P2, and the base substrate L1, respectively, without an empty space therebetween.

Referring to FIG. 7B, a first portion SM1-1 of a reinforcing member SM1 overlapping the first region A1 may be in direct contact with the base substrate L1, a second portion SM1-2 may be in direct contact with the first surface S1 of the first plate P1, and a third portion SM1-3 may be in direct contact with the first opposite surface SF1 of the first plate P1. Although only the reinforcing member SM1 overlapping the first region A1 has been described, this description also applies to a reinforcing member SM2 overlapping the second region A2.

As illustrated in the drawings, the reinforcing member SM may be a film. However, embodiments of the present disclosure are not necessarily limited thereto and the reinforcing member SM may be provided in various forms. For example, in an embodiment the reinforcing member SM may be a polyimide film.

The reinforcing member SM may have a smaller thickness than a thickness (e.g., a maximum thickness) of the first plate P1 and the second plate P2. In addition, the reinforcing member SM may have a lower strength than a strength of the first plate P1 and the second plate P2.

According to an embodiment of the present disclosure, the strength of the reinforcing member SM may be in a range of between about 5% to about 20% of the strength of the first plate P1 and the second plate P2. For example, the strength of the reinforcing member SM may be about 10% of the strength of the first plate P1 and the second plate P2.

For example, when the first plate P1 and the second plate P2 have a modulus of 70 GPA, the strength of the reinforcing member SM may be less than about 70 GPA.

In an embodiment, the reinforcing member SM may overlap the first region A1 or the second region A2 and may not overlap the bending region BA. For example, one end of the reinforcing member SM1 may substantially overlap a first boundary line BL1, and one end of the reinforcing member SM2 may substantially overlap a second boundary line BL2. The expression "substantially overlap" may mean that the reinforcing member SM may partially overlap the bending region BA due to a process error.

Figure 8A:
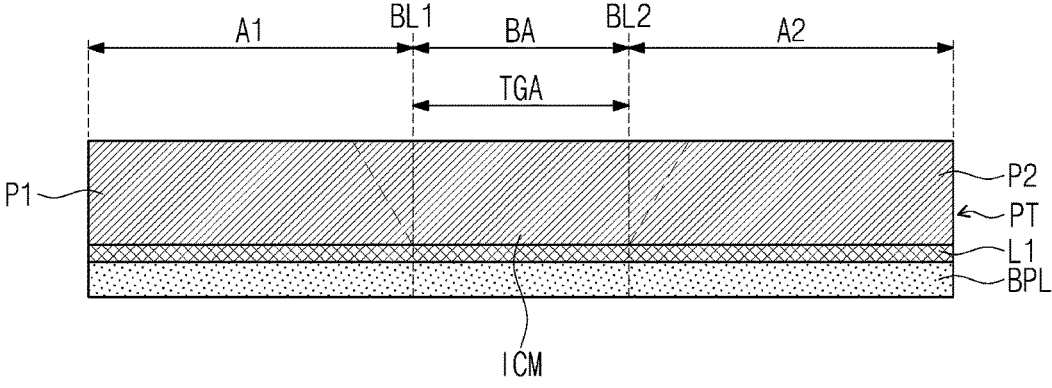
FIGS. 8A to 8C are enlarged cross-sectional views illustrating a portion of a display panel and a portion of a plate according to embodiments of the present disclosure.
Figure 8B:
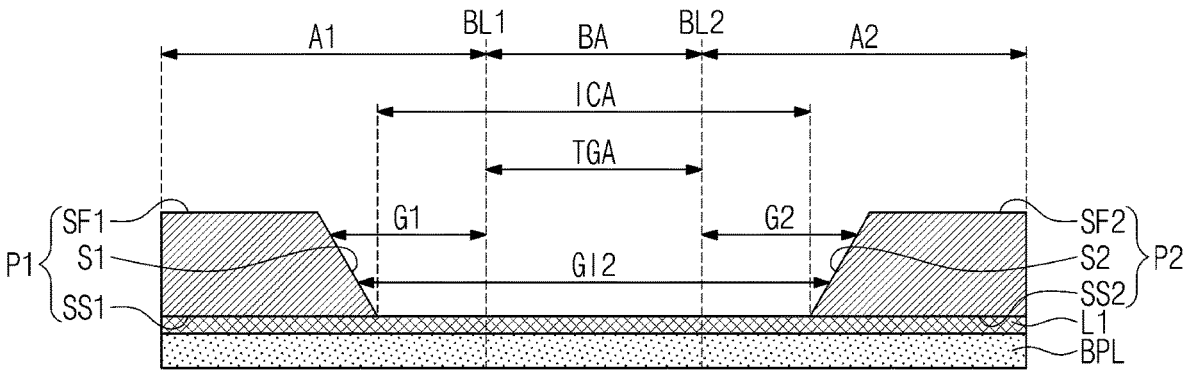
Figure 8C:
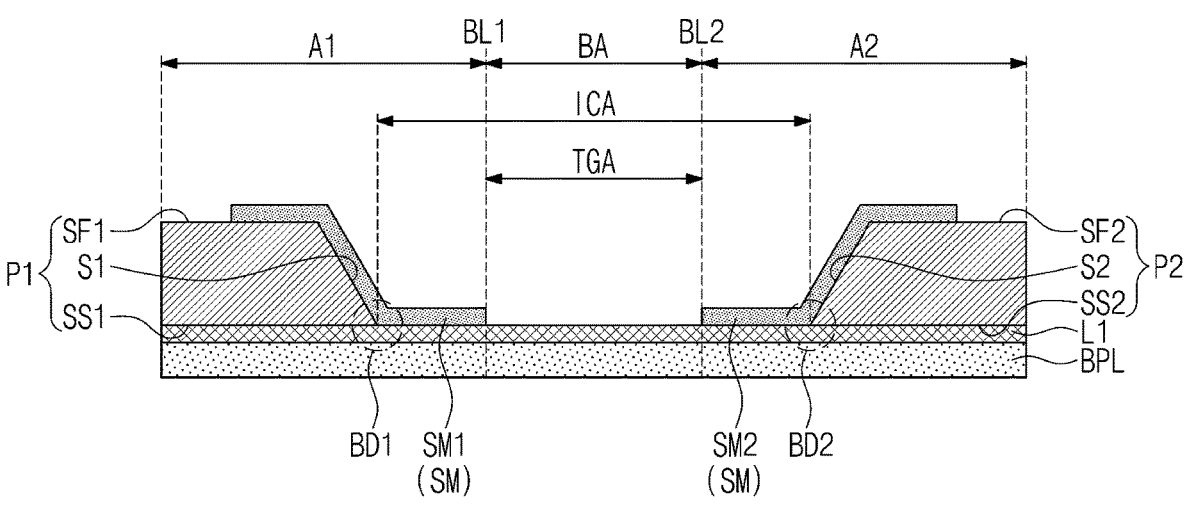

FIGS. 8A to 8C are enlarged views illustrating a portion of the display panel and a portion of the plate according to embodiments of the present disclosure.

According to an embodiment of the present disclosure, the first plate P1 and the second plate P2 may be components divided from each other by removal of a portion of the same plate PT. For example, the first plate P1 and the second plate P2 may be divided from each other by removal of a portion overlapping the bending region BA from the plate PT, such as a portion overlapping an entirety of the bending region BA and portions overlapping the first and second regions A1, A2. Hereinafter, for convenience of description, a portion of the plate to be removed is defined as a cut-away portion ICM, and the contents of the present disclosure will be described using this.

Referring to FIGS. 8A and 8B, the plate PT may include the first plate P1 and the second plate P2, and in an embodiment shown in FIG. 8A, the first plate P1 and the second plate P2 may not be divided from each other. For example, each of the first plate P1 and the second plate P2 may be a portion of the plate PT.

The first plate P1 and the second plate P2 may be formed by removing the cut-away portion ICM of the plate PT. In an embodiment, the cut-away portion ICM of the plate PT may be removed through an etching process. However, embodiments of the present disclosure are not necessarily limited thereto and the cut-away portion ICM of the plate PT may be removed through various removal methods such as a laser, etc. For example, in an embodiment the plate PT may include glass. Alternatively, the plate PT may be composed entirely of glass. An etching solution (e.g., HF) may be used to etch the glass of the plate.

In an embodiment, the portion removed from the plate PT, such as the cut-away portion ICM of the plate PT may vary depending on a design value of a product and the curvature of the bending region BA. In an embodiment, the portion removed from the plate PT, such as the cut-away portion ICM of the plate PT may be the entire portion overlapping the bending region BA. However, embodiments of the present disclosure are not necessarily limited thereto and the cut-away portion ICM of the plate PT may be only a portion overlapping the bending region BA. The cut-away portion ICM may correspond to a preset removal region TGA depending on the design value of the product.

As the cut-away portion ICM is removed from the plate PT, the first surface S1 of the first plate P1 and the second surface S2 of the second plate P2 may be spaced apart from each other by the predetermined gap G12.

The cut-away portion ICM is not necessarily limited to the portion overlapping the bending region BA. In an embodiment as shown in FIG. 8B, the cut-away portion ICM may also overlap a portion of the first region A1 and a portion of the second region A2. In this embodiment, the portion of the first region A1 and the portion of the second region A2, together with the portion overlapping the bending region BA, may be removed from the plate PT through the above-described process. For example, the first plate P1 and the second plate P2 may be spaced apart from the bending region BA by a predetermined distance.

As shown in an embodiment of FIG. 8B, the first plate P1 may be spaced apart from the first boundary line BL1 between the first region A1 and the bending region BA by a predetermined distance, and the second plate P2 may be spaced apart from the second boundary line BL2 between the second region A2 and the bending region BA by a predetermined distance, such as when the display module is in an unbent state. In an embodiment, the first surface S1 of the first plate P1 and the first boundary line BL1 have a predetermined gap G1 in a direction crossing a bending axis BX, such as the second direction DR2, and the second surface S2 of the second plate P2 and the second boundary line BL2 have a predetermined gap G2 in the second direction DR2, such as when the display module is in an unbent state.

The first surface S1 may be inclined towards the first boundary line BL1 from the rear surface of the base substrate L1, and the second surface S2 may be inclined towards the second boundary line BL2 from the rear surface of the base substrate L1.

In this embodiment, the size of the cut-away portion ICM may be increased, as compared with an embodiment in which a portion of the first surface S1 of the first plate P1 described above partially overlaps the first boundary line BL1 and a portion of the second surface S2 of the second plate P2 partially overlaps the second boundary line BL2. In this embodiment, a cut-away region ICA corresponding to the cut-away portion ICM may be larger than the preset removal region TGA depending on the design value of the product.

According to an embodiment of the present disclosure, in an embodiment in which a portion of the plate PT, such as the cut-away portion ICM, is removed by providing an etching solution to the plate PT including glass, the cut-away region ICA corresponding to the cut-away portion ICM, that is, the etching width in the plate PT may be widened, and thus the fluidity of the etching solution may be increased. Accordingly, sludge may be prevented from being generated in the etching process of the plate PT, and thus an etching deviation for each location may be prevented. In this embodiment, the cut-away region ICA corresponding to the cut-away portion ICM removed through the etching solution may be larger than the preset removal region TGA depending on the design value of the product.

Referring to FIG. 8C, the reinforcing member SM may at least partially cover the first plate P1 and the second plate P2. The reinforcing member SM may be brought into direct contact with the first plate P1 and the second plate P2 without a separation space.

The reinforcing member SM may increase the adhesive force between the first plate P1, the second plate P2, and the base substrate L1 by covering the first plate P1 and the second plate P2. In this embodiment, the reinforcing member SM may be formed of a material with high adhesion, and a material used for the reinforcing member SM may vary depending on the design of a product and is not necessarily limited to any one material.

In an embodiment as shown in FIG. 8C, the reinforcing member SM may overlap an entirety of a partial region of the first region A1 that is positioned between the first boundary line BL1 and the first surface S1 and an entirety of a partial region of the second region A2 that is positioned between the second surface S2 and the second boundary line BL2. For example, the reinforcing member SM may be in direct contact with the base substrate L1. The reinforcing member SM may be brought into direct contact with the base substrate L1 without a separation space.

A jig may be used such that the reinforcing member SM is brought into direct contact with the first plate P1 and the base substrate L1 or the second plate P2 and the base substrate L1 at the end BD1 of the interface between the first plate P1 and the base substrate L1 and the end BD2 of the interface between the second plate P2 and the base substrate L1. In this embodiment, a device for bringing the reinforcing member SM into direct contact with the first plate P1, the second plate P2, and the base substrate L1 may include various devices without necessarily being limited to the jig.

The reinforcing member SM may be in direct contact with the base substrate L1 and may support the base substrate L1 together with the first plate P1 or the second plate P2. Accordingly, the reinforcing member SM, together with the first plate P1 and the second plate P2, may alleviate a force (e.g., strain) applied to the base substrate L1. The reinforcing member SM may be formed of a material with high strength and may alleviate a force applied to the base substrate L1. In this embodiment, the strength of the reinforcing member SM may be less than or equal to that of the first plate P1 and the second plate P2. In an embodiment, the strength of the reinforcing member SM may be in a range of between about 5% to about 20% of the strength of the first plate P1 and the second plate P2 and may be about 10% of the strength of the first plate P1 and the second plate P2. In an embodiment in which the first plate P1 and the second plate P2 have a modulus of about 70 GPA, the strength of the reinforcing member SM may be less than about 70 GPA.

The reinforcing member SM may have a smaller thickness than the first plate P1 and the second plate P2. Furthermore, the reinforcing member SM may be formed of a material with high adhesion and may prevent a lifting phenomenon due to a decrease in adhesive force between the reinforcing member SM and the base substrate L1. For example, the reinforcing member SM may be provided in the form of a film.

In an embodiment, the reinforcing member SM may be applied to the first plate P1, the second plate P2, or the base substrate L1 by a laminating method. However, embodiments of the present disclosure are not necessarily limited thereto and the reinforcing member SM may be applied to the first plate P1, the second plate P2, or the base substrate L1 by various methods.

Referring to the drawings, the reinforcing member SM may not overlap the bending region BA. However, embodiments of the present disclosure are not necessarily limited thereto and a portion of the reinforcing member SM may overlap the bending region BA.

Figure 9:
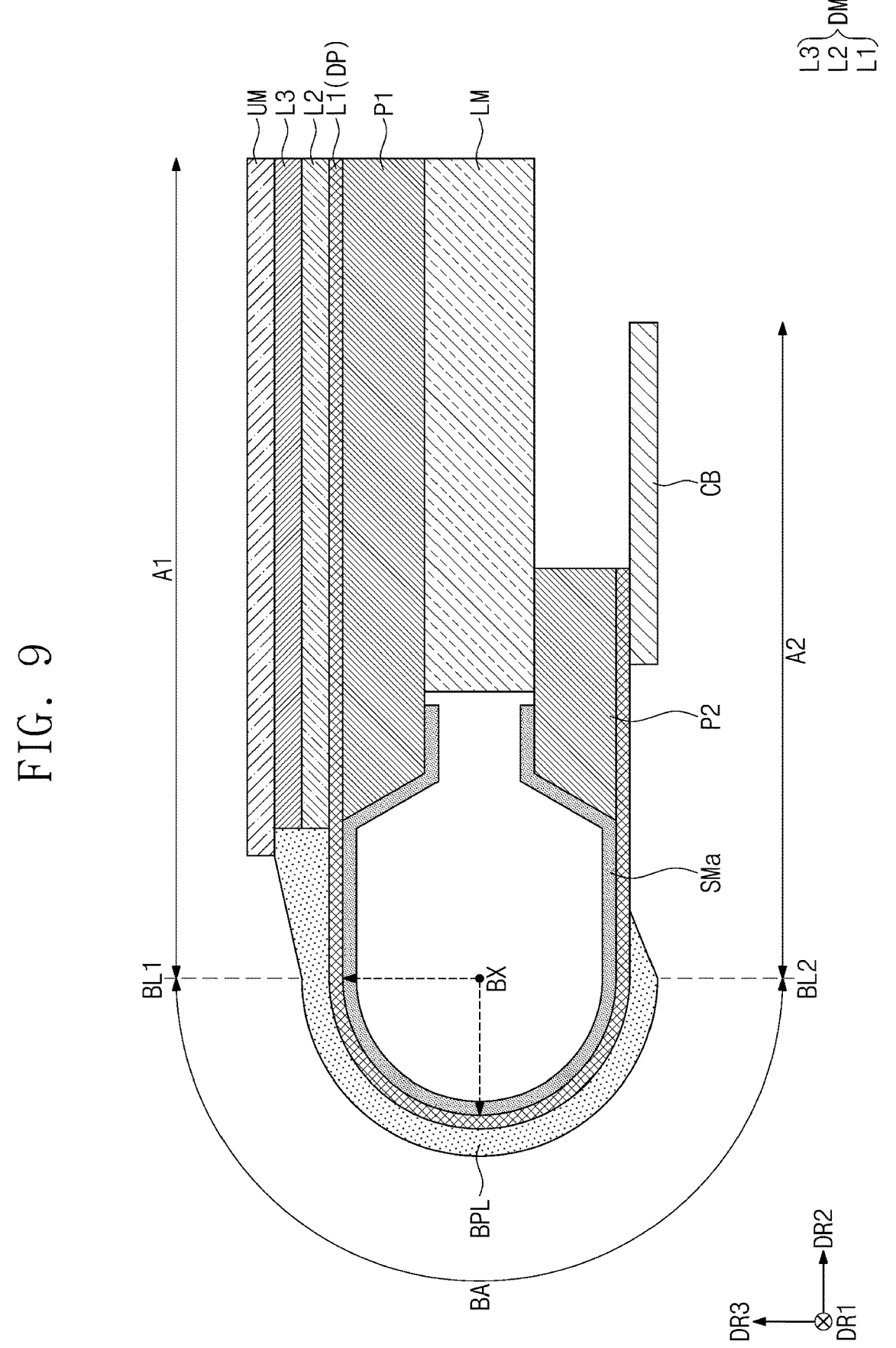
FIG. 9 is a partial cross-sectional view of a display device according to an embodiment of the present disclosure.

FIG. 9 is a partial cross-sectional view of a display device according to an embodiment of the present disclosure.

FIG. 9 illustrates an embodiment in which a reinforcing member SMa according to an embodiment of the present disclosure overlaps a bending region BA. In the description of FIG. 9, it will be described with reference to FIG. 8, and a repeated description of the same reference numerals as those in FIG. 8 may be omitted for economy of description.

The reinforcing member SMa may have a smaller thickness than a first plate P1 and a second plate P2 and may have a lower strength than the first plate P1 and the second plate P2. Accordingly, the reinforcing member SMa may prevent excessive stress from being applied to the bending region BA of a base substrate L1 due to bending. In an embodiment, as shown in FIG. 9, the reinforcing member SMa may overlap an entirety of the bending region BA and portions of the first and second regions A1, A2.

Figure 10:
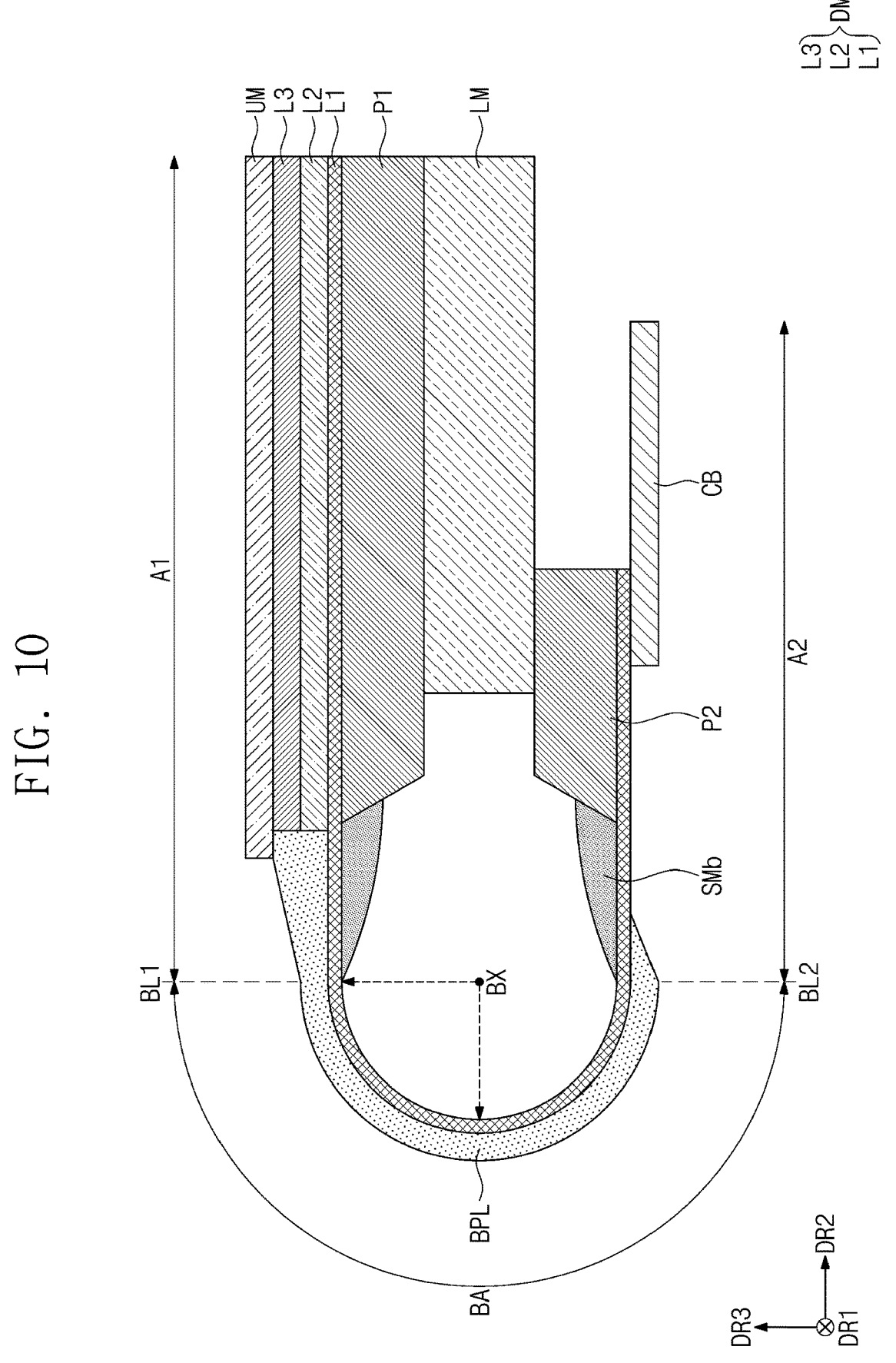
FIGS. 10 and 11 are partial cross-sectional views of display devices according to embodiments of the present disclosure.
Figure 11:
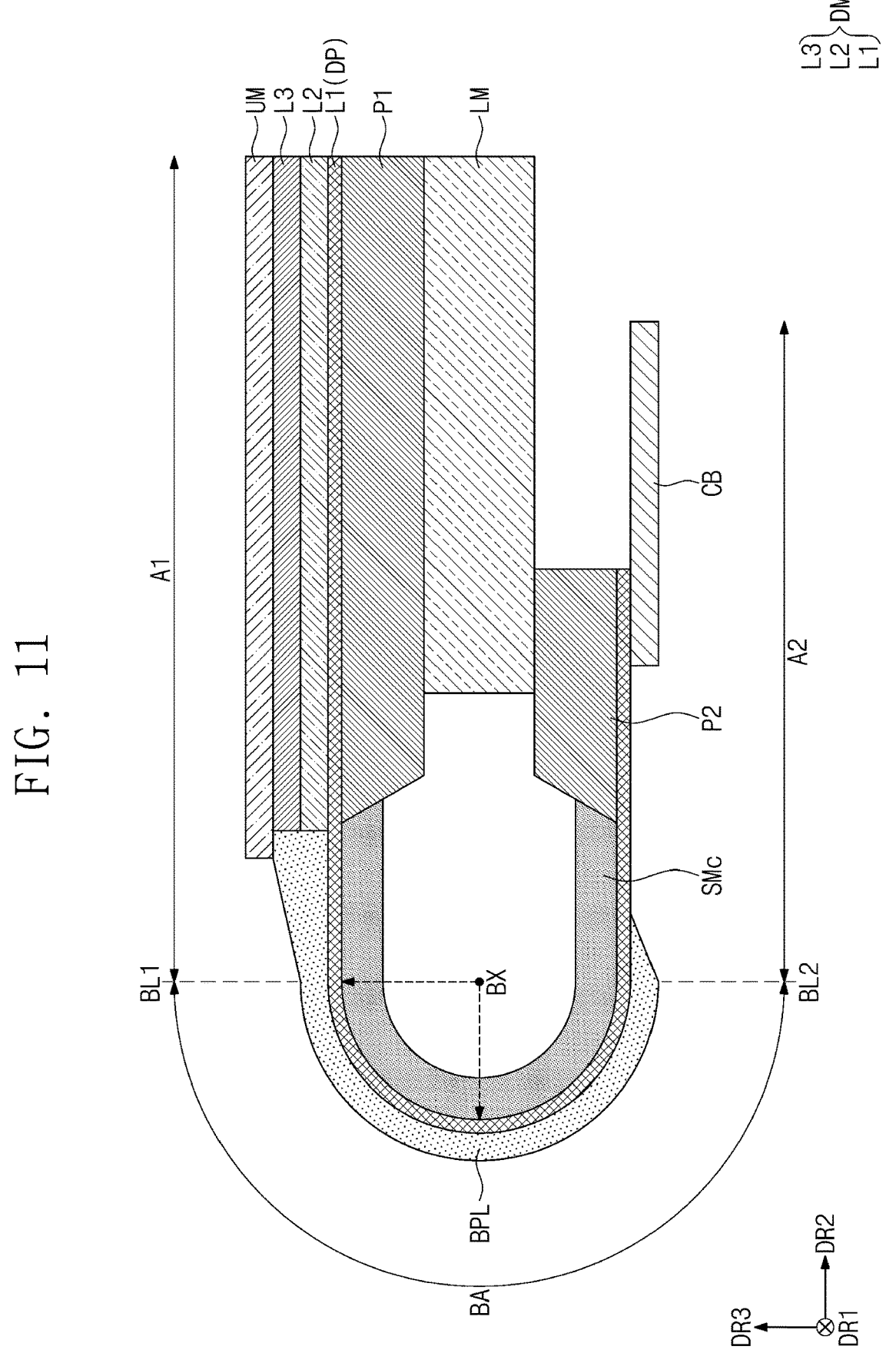

FIGS. 10 and 11 are partial cross-sectional views of display devices according to embodiments of the present disclosure.

FIGS. 10 and 11 illustrate embodiments in which reinforcing members SMb and SMc according to embodiments of the present disclosure are provided in a thick form rather than a film form. In the description of FIGS. 10 and 11, it will be given with reference to FIGS. 8 and 9, and repeated descriptions of the same reference numerals as those in FIGS. 8 and 9 may be omitted for economy of description.

Unlike the above-described reinforcing members SM and SMa as shown in embodiments of FIGS. 6-9, the reinforcing members SMb and SMc may be applied thicker to base substrates L1 by a method other than laminating without being thinly applied to the base substrates L1. For example, the reinforcing members SMb and SMc may be provided in various forms without necessarily being limited to the above-described reinforcing members SM and SMa having a film form.

In an embodiment as illustrated in FIG. 10, the reinforcing member SMb may not overlap a bending region BA. Additionally, the reinforcing member SMb may cover only a portion of the first and second surfaces S1, S2. However, embodiments of the present disclosure are not necessarily limited thereto and the reinforcing member SMc may overlap a bending region BA as illustrated in FIG. 11. For example, as shown in an embodiment of FIG. 11, the reinforcing member SMc may overlap an entirety of the bending region BA. However, embodiments of the present disclosure are not necessarily limited thereto.

Figure 12:
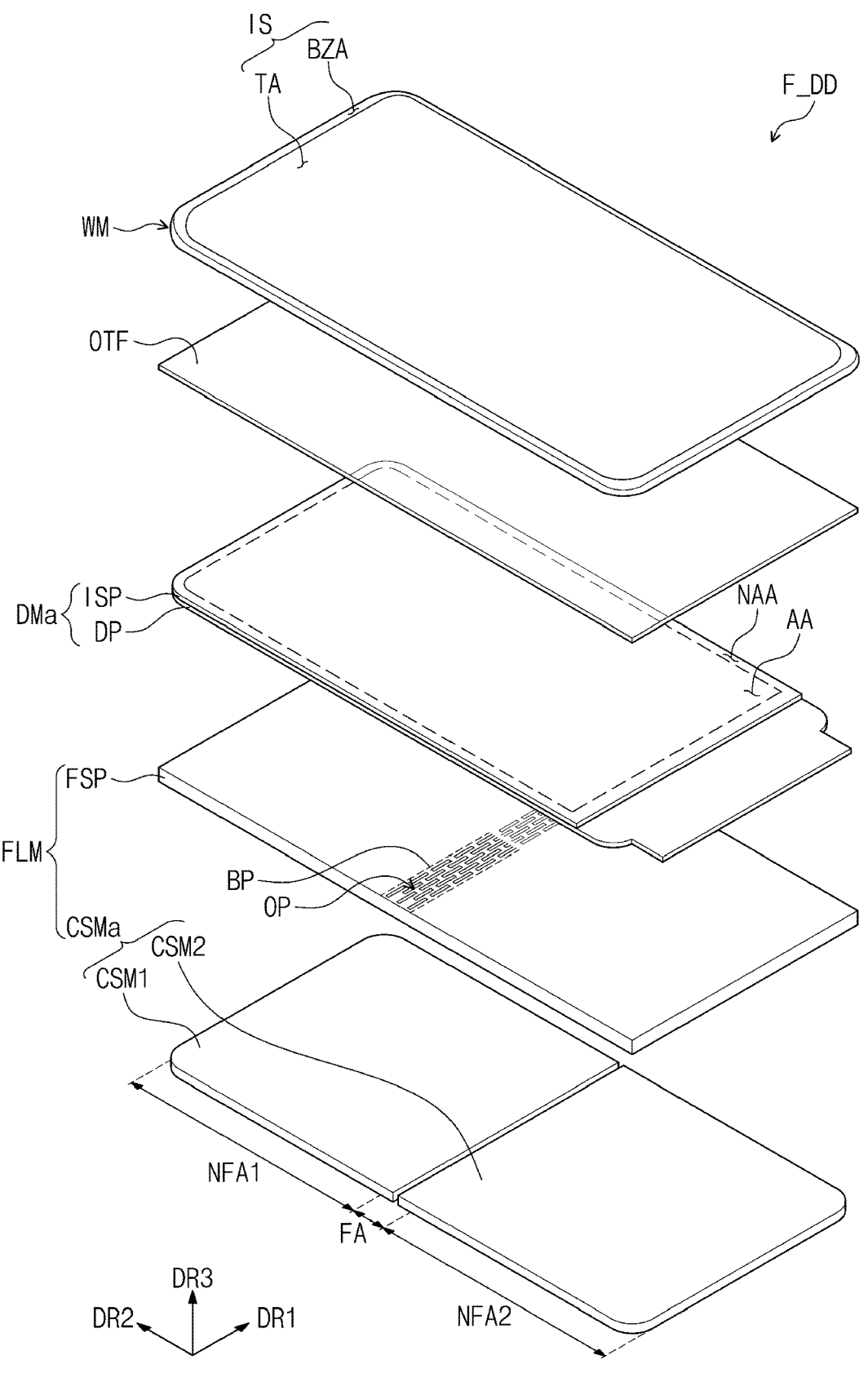
FIG. 12 is an exploded perspective view of a display device according to an embodiment of the present disclosure.

FIG. 12 is an exploded perspective view of a display device according to an embodiment of the present disclosure.

FIG. 12 is an exploded perspective view of the display device in a foldable structure according to an embodiment of the present disclosure. In the description of FIG. 12, it will be described with reference to FIG. 2, and repeated descriptions of the same reference numerals as those in FIG. 2 may be omitted for economy of description.

Referring to FIG. 12, the display device F_DD according to an embodiment of the present disclosure may include a display module DMa displaying an image, an upper module disposed on the display module DMa, and a lower module disposed under the display module DMa. The display module DMa may constitute a part of the display device F_DD. In particular, an image may be generated by the display module DMa.

The display module DMa may include a display panel DP and an input sensing layer ISP. The display panel DP may be a flexible display panel. The display panel DP may include a folding region FA and a plurality of non-folding regions, such as first and second non-folding regions NFA1 and NFA2. Accordingly, in some embodiments the display panel DP may be entirely rolled, or may be folded or unfolded about a folding axis.

The upper module may include a window WM disposed on the display module DMa. The window WM may be optically transparent. Accordingly, an image generated by the display module DMa may pass through the window WM and may be easily recognized by a user. In an embodiment, the window WM may further include an insulating material. The upper module may further include an optical film OTF disposed between the display module DMa and the window WM (e.g., in the third direction DR3).

The lower module FLM may include a support plate FSP disposed under the display module DMa and a cover support plate CSMa. In an embodiment, the cover support plate CSMa may include as many cover support plates CSM1 and CSM2 as the plurality of non-folding regions, such as the first and second non-folding regions NFA1 and NFA2. In an embodiment of the present disclosure, the cover support plate CSMa may include the first cover support plate CSM1 and the second cover support plate CSM2 spaced apart from the first cover support plate CSM1 (e.g., in the second direction DR2). However, embodiments of the present disclosure are not necessarily limited thereto and the number of the cover support plates may vary.

The first and second cover support plates CSM1 and CSM2 may be disposed to correspond to the first and second non-folding regions NFA1 and NFA2, respectively. The first cover support plate CSM1 may be disposed to correspond to the first non-folding region NFA1 of the display module DMa, and the second cover support plate CSM2 may be disposed to correspond to the second non-folding region NFA2 of the display module DMa. Furthermore, the support plate FSP may be disposed to overlap the plurality of non-folding regions, such as the first and second non-folding regions NFA1 and NFA2, of the display panel DP.

The support plate FSP is disposed on a rear surface of the display panel DP and performs a function of supporting the display panel DP. The support plate FSP may be a protective plate that protects the display panel DP by absorbing an impact applied from the outside or blocking infiltration of foreign matter/moisture into the display panel DP.

The support plate FSP may include a bending portion BP corresponding to the folding region FA. A plurality of patterns OP may be provided in the bending portion BP. The plurality of patterns OP may be arranged at predetermined intervals within the bending portion BP. In an embodiment, the plurality of patterns OP may be disposed in a zigzag configuration. However, embodiments of the present disclosure are not necessarily limited thereto. Furthermore, each of the plurality of patterns OP may be an opening pattern formed through a lower plate PP. However, embodiments of the present disclosure are not necessarily limited thereto. For example, each of the plurality of patterns OP may be a groove pattern recessed from one surface (e.g., an upper surface or a lower surface) of the lower plate PP. Each of the plurality of patterns OP may have a quadrangular shape extending in a first direction DR1 along the folding region FA. However, embodiments of the present disclosure are not necessarily limited thereto and the shape of the plurality of patterns OP may vary. For example, in some embodiments each of the plurality of patterns OP may have a rhombic shape or a circular shape.

The bending portion BP may have the plurality of patterns OP provided therein, and thus the flexibility of the bending portion BP may be increased. The support plate FSP may facilitate folding of the display device F_DD while supporting the display module DMa.

The display device according to the embodiment of the present disclosure may prevent foreign matter from being generated in the bending region. More particularly, the display device may prevent sludge from being generated due to etching in the bending region.

The display device according to the embodiment of the present disclosure may increase adhesion between the plate and the display panel. More particularly, the display device may increase adhesion between the base substrate and the plate.

The display device according to the embodiment of the present disclosure may include the reinforcing member capable of alleviating stress in the bending region.

While the present disclosure has been described with reference to non-limiting embodiments thereof, it will be apparent to those of ordinary skill in the art that various changes and modifications may be made thereto without departing from the spirit and scope of the present disclosure.

What is claimed is:

1. A display device comprising:
   a display panel including a base substrate and a plurality of pixels, wherein the base substrate includes a first region, a second region, and a bending region between the first region and the second region, the plurality of pixels are disposed on a front surface of the base substrate in the first region and the plurality of pixels are spaced apart from the second region;

a drive circuit disposed on the second region and electrically connected with the display panel;

a first plate disposed on a rear surface of the base substrate and overlapping at least a portion of the first region, the first plate including a first surface facing towards the bending region;

a second plate disposed on the rear surface of the base substrate and overlapping at least a portion the second region, the second plate including a second surface facing towards the bending region; and a reinforcing member disposed on the rear surface of the base substrate and covering at least a portion of at least one of the first surface and the second surface, wherein an entirety of the reinforcing member is spaced apart from the bending region in a plan view, wherein the reinforcing member prevents the base substrate from bending.

2. The display device of claim 1, wherein a gap between the first surface and the second surface varies in a direction towards the rear surface of the base substrate.

3. The display device of claim 1, wherein:

the first surface is spaced apart from a first boundary line positioned between the first region and the bending region in the plan view by a predetermined distance; and the second surface is spaced apart from a second boundary line positioned between the second region and the bending region in the plan view by a predetermined distance.

4. The display device of claim 1, wherein a thickness of the reinforcing member is less than thicknesses of the first plate and the second plate.

5. The display device of claim 1, wherein the reinforcing member has a strength that is less than strengths of the first plate and the second plate.

6. The display device of claim 1, wherein:

the first plate includes a first support surface supporting the display panel and a first opposite surface facing away from the first support surface, wherein the first surface connects the first support surface and the first opposite surface to each other;

the second plate includes a second support surface supporting the display panel and a second opposite surface facing away from the second support surface, wherein the second surface connects the second support surface and the second opposite surface; and the reinforcing member additionally covers at least a portion of the first opposite surface and at least a portion of the second opposite surface.

7. The display device of claim 1, further comprising a bending protection layer covering the base substrate.

8. The display device of claim 1, wherein the first plate and the second plate include glass.

9. A display device comprising:

a display panel including a first region, a second region, and a bending region between the first region and the second region;

a first plate disposed on a rear surface of the display panel and overlapping at least a portion of the first region, the first plate including a first surface facing towards the bending region;

a second plate disposed on the rear surface of the display panel and overlapping at least a portion of the second region, the second plate including a second surface facing towards the bending region; and a reinforcing member disposed on the rear surface of the display panel and covering at least a portion of at least one of the first surface and the second surface, wherein an entirety of a gap between the first surface and the second surface continually varies in a direction towards the display panel.

10. The display device of claim 9, wherein:

the first plate includes a first contact surface supporting the display panel and a first opposite surface facing away from the first contact surface, wherein the first surface connects the first contact surface and the first opposite surface to each other;

the second plate includes a second contact surface supporting the display panel and a second opposite surface facing away from the second contact surface, wherein the second surface connects the second contact surface and the second opposite surface to each other; and the reinforcing member additionally covers at least a portion of the first opposite surface and at least a portion of the second opposite surface.

11. The display device of claim 9, wherein the first surface and the second surface do not overlap the bending region.

12. The display device of claim 9, wherein a thickness of the reinforcing member is less than thicknesses of the first plate and the second plate.

13. The display device of claim 9, wherein the reinforcing member has a strength that is less than strengths of the first plate and the second plate.

14. The display device of claim 9, wherein strength of the reinforcing member is in a range of about 5% to about 20% of strengths of the first plate and the second plate.

15. The display device of claim 9, wherein the reinforcing member does not overlap the bending region.

16. The display device of claim 9, wherein the first plate and the second plate include glass.

17. The display device of claim 9, further comprising a bending protection layer covering the display panel.

18. A An electronic device, comprising:

a display device comprising:

a display panel including a first region, a second region, and a bending region between the first region and the second region;

a first plate disposed on a rear surface of the display panel and overlapping the first region, the first plate including a first surface facing towards the bending region;

a second plate disposed on the rear surface of the display panel and overlapping the second region, the second plate including a second surface facing towards the bending region; and a reinforcing member disposed on the rear surface of the display panel and covering at least a portion of at least one of the first surface and the second surface, wherein an entirety of a gap between the first surface and the second surface continually decreases in a direction towards the display panel.

19. The electronic device of claim 18, wherein:

the first surface is spaced apart from a first boundary line positioned between the first region and the bending region by a predetermined distance; and the second surface is spaced apart from a second boundary line positioned between the second region and the bending region by a predetermined distance.

* * * * *